United States Patent [19]

Sinberg

[11] Patent Number: 5,038,375
[45] Date of Patent: Aug. 6, 1991

[54] CIRCUIT ARRANGEMENT FOR PREVENTING GAIN FROM RESPONDING TO FREQUENCY VARIATION DESPITE THE PRESENCE OF AN ISOLATION TRANSFORMER

[75] Inventor: Howard Sinberg, Coral Springs, Fla.

[73] Assignee: Aptek Technologies, Inc., Deerfield Beach, Fla.

[21] Appl. No.: 370,899

[22] Filed: Jun. 23, 1989

[51] Int. Cl.[5] .............................................. H04M 7/04
[52] U.S. Cl. ................................... 379/398; 379/345; 379/402; 330/259
[58] Field of Search ............... 379/345, 349, 398, 399, 379/402, 403, 404, 405, 413; 330/109, 259, 276, 293; 333/213, 214

[56] References Cited

U.S. PATENT DOCUMENTS

| | | | |
|---|---|---|---|
| 4,156,859 | 5/1979 | Forward et al. | 333/213 |
| 4,253,070 | 2/1981 | Carlsen, II | 330/260 |
| 4,357,495 | 11/1982 | Sweet et al. | 374/340 |
| 4,503,289 | 3/1985 | Spires | 379/345 |

Primary Examiner—James L. Dwyer
Assistant Examiner—M. Shehara
Attorney, Agent, or Firm—Darby & Darby

[57] ABSTRACT

By the use of a feedback arrangement, deleterious circuit effects of an isolation transformer in a terminal device for a telephone line can be eliminated. By this arrangement, a smaller, cheaper transformer may be used. A terminal device employing such arrangement can present a balanced termination to a telephone line, exhibit a known and controlled impedance to that line and provide for signals to be coupled to and from that line.

13 Claims, 2 Drawing Sheets

CIRCUIT ARRANGEMENT FOR PREVENTING GAIN FROM RESPONDING TO FREQUENCY VARIATION DESPITE THE PRESENCE OF AN ISOLATION TRANSFORMER

BACKGROUND OF THE INVENTION a) Field of the Invention

The present invention relates to the performance and use of transformers in telephone terminal equipment and, more particularly, an arrangement and technique for improving circuit performance and reducing the size of such transformers.

b) Background of the Prior Art

Any terminal device connected to a telephone line must exhibit isolation between that line and all other connections to the terminal equipment. This requirement, which is imposed by telecommunications regulatory agencies worldwide, serves both a network protection function and a performance assurance function. The common means of achieving this isolation is by coupling signals to and from the telephone line through a transformer.

Use of a transformer, while allowing the isolation requirement to be met, generally creates various technical problems which must be considered in the design of the terminal. Among these are:

1. Poor frequency response. The ability to transfer power from one winding of a transformer to another deteriorates as frequency is reduced.

2. Phase shifts, most significant at low frequencies, render hybrid cancellation, an important function of many terminal devices, difficult to achieve. Hybrid cancellation is achieved by subtracting the signal transmitted to the phone line from that reflected from the phone line. If the relative phase of these signals is not constant, the phase of one or the other of them must be shifted so as to neutralize the effect of the phase shift introduced by the transformer. Because this shift varies with frequency, this is a goal that can at best be poorly approximated.

3. Impedance reflected through the transformer cannot be directly correlated to the impedance with which the transformer is terminated. In particular, every country's telecommunications regulatory agency specifies that a terminal device exhibit some specific impedance to the telephone line. Selecting the impedance with which the transformer must be terminated so as to reflect the desired impedance to the line is a difficult engineering task. The usual result is that the desired impedance is only poorly approximated.

4. All of the above problems are compounded by the fact that the transformer's behavior is different for differing telephone line currents. As the DC current through the transformer winding facing the telephone loop increases, the transformer core approaches a condition of saturation. This reduces the mutual inductance of transformer windings, deteriorating the transformer's ability to convey power from one winding to another and magnifying the effects of the above problems.

Problems 1 through 3 above can be ameliorated to some extent by increasing the inductance of the transformer's windings and the coupling between them. Problem 4 can be reduced by incorporating more core material (usually some iron alloy) so that the core remains farther from saturation over the expected range of loop currents. These measures in turn introduce an additional problem which is that:

5. Good telecommunications transformers are physically large and heavy, and are expensive.

It is an object of the present invention to provide an arrangement and technique which substantially reduces problems 1 through 4 above, while allowing the use of a transformer that is smaller, lighter and cheaper than would otherwise be possible.

SUMMARY OF THE INVENTION

In accordance with the invention, an arrangement for substantially eliminating circuit performance limitations of a transformer comprises an operational amplifier having an inverting input, a non-inverting input and an output and having an input impedance, $Z_2$, connected from an input terminal to the amplifier inverting input; a transformer having a primary winding and a secondary winding, the primary winding being connected to the output of said amplifier and the secondary winding being connected to an output terminal; and a feedback impedance, $Z_1$, being connected from the output terminal to the inverting input of the amplifier. The transformer is thereby included within the feedback loop of the operational amplifier so as to substantially eliminate any contribution of the transformer to the circuit performance without substantially affecting the circuit gain from the input terminal to the output terminal.

Also in accordance with the invention, in a terminal device for connection to a telephone line, an arrangement for substantially eliminating circuit performance limitations of a line isolation transformer comprises a first operational amplifier having an inverting input, a non-inverting input and an output and having an input impedance, $Z_2$, connected from an input terminal to the amplifier inverting input and a line isolation transformer having a primary winding and a secondary winding. The primary winding is connected between the output of the amplifier and circuit ground. The secondary winding is balanced with respect to ground. A second operational amplifier is also included having an inverting input, a noninverting input and an output. The transformer secondary winding is coupled to the second operational amplifier inverting and non-inverting inputs by respective input resistors and DC blocking capacitors. Input and feedback resistors in said second operational amplifier are selected to set the gain of the second operational amplifier. A feedback impedance, $Z_1$, of the first operational amplifier is connected between the output of the second operational amplifier and the inverting input of the first operational amplifier. The line isolation transformer is thus included within the feedback loop of the first operational amplifier and has a balanced output winding so as to provide isolation without substantially affecting the circuit gain from the input terminal to the balanced output in order to substantially eliminate any contribution of the transformer to circuit performance. In a further aspect of the invention, a first resistor is connected between one side of the output transformer winding and one output terminal and a second resistor is connected between the other side of the output transformer winding and the other output terminal. A third operational amplifier circuit is coupled from the output terminals to the inverting input of the first amplifier through an impedance, $Z_3$.

For a better understanding of the present invention, reference is made to the following description and accompanying drawings while the scope of the invention will be pointed out in the appended claims.

DESCRIPTION OF THE PREFERRED EMBODIMENTS

Figure 1:
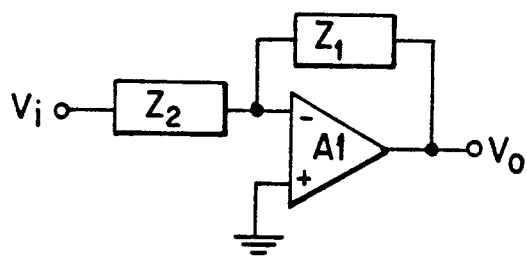
FIG. 1 is a schematic circuit diagram of a typical operational amplifier having a gain of $-Z_1/Z_2$.
Figure 2:
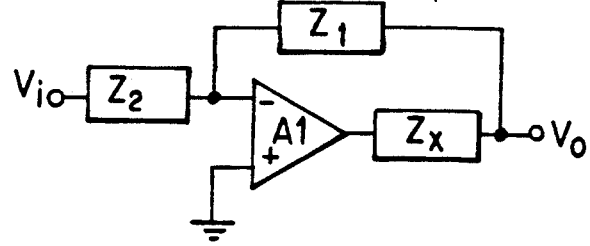
FIG. 2 is a schematic circuit diagram illustrating the effect of inserting an impedance $Z_x$ in the feedback loop of the amplifier.

FIG. 1 illustrates an operational amplifier A1 configured as a conventional inverting gain stage with an input voltage $V_i$ and an output voltage $V_o$. The voltage gain (ratio of output voltage to input voltage) of this configuration is very closely approximated by the negative of the ratio of impedances $Z_1$ and $Z_2$ (i.e. $\alpha = -Z_1/Z_2$ where $\alpha$ is the voltage gain and the negative sign indicates that this is an inverting amplifier). This is a truism that is generally known to those skilled in the art. Equally true, and also generally known, is that some impedance '$Z_x$' may be inserted in series with the output of the operational amplifier (but before the feedback impedance $Z_1$), and, provided that certain conditions are met, the resulting amplifier circuit (as shown in FIG. 2) still has a voltage gain $\alpha = -Z_1/Z_2$. In such a case the impedance $Z_x$ is said to be "in the feedback loop". It is most important that the impedance $Z_x$ not have sufficient phase shift at the frequency of the input signal to render the circuit unstable, and that the magnitude of the impedance $Z_x$ be not so great that the operational amplifier cannot deliver the required output signal through $Z_x$ to the output load.

It is important to note that as long as these conditions are met, the phase shift introduced by $Z_x$ has no significant effect on the phase of the output voltage of the gain stage relative to its input voltage. An operational amplifier in a feedback-controlled configuration automatically adjusts its output so that the output of the overall circuit meets the equation $\alpha = -Z_1/Z_2$.

Figure 3:
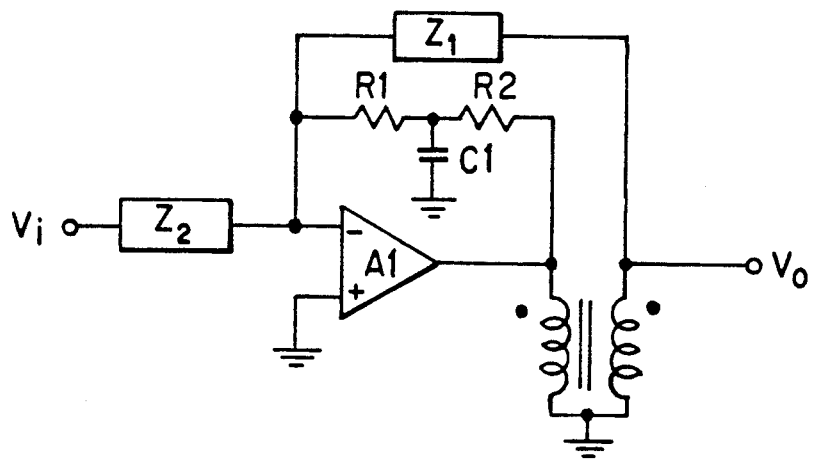
FIG. 3 is a schematic circuit arrangement in accordance with the invention illustrating the incorporation of a transformer in the feedback loop.

The present invention takes the progression from basic amplifier to amplifier with an impedance in its feedback loop one step farther, and puts a transformer in the feedback loop as shown in FIG. 3. Because there is no DC continuity between transformer windings, the network consisting of R1, R2 and C1 has been added. These components feed DC information from the output of the operational amplifier to its input, thereby maintaining DC stability, while having a minimal effect on the AC characteristics of the overall circuit. For signals in the frequency range of interest, the amplifier voltage gain still closely approximates $\alpha = -Z_1/Z_2$.

Telecommunications applications generally require that telephone terminal equipment be balanced; that is, the impedance to ground of both of the two wires connected to the telephone network be equal to within a very small tolerance. Clearly this cannot be achieved if one side of the transformer secondary is grounded, so the modification shown in FIG. 4 must now be introduced.

Figure 4:
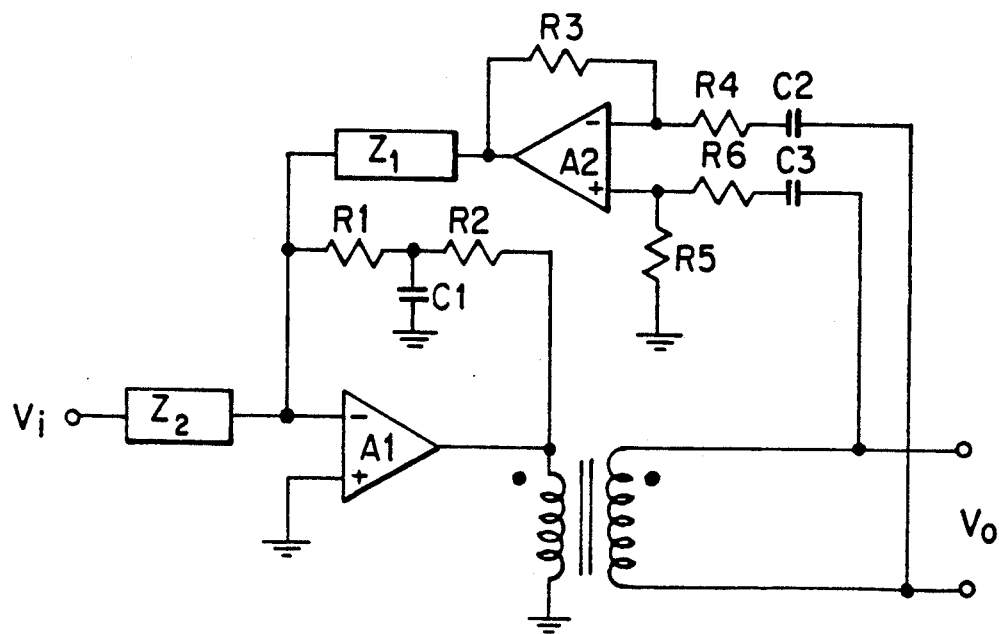
FIG. 4 is a schematic circuit arrangement in accordance with the invention with the transformer, which is in the feedback loop, being balanced with respect to ground.

In FIG. 4, the output is taken across the transformer secondary, balanced with respect to ground. A differential input amplifier with single-ended output, A2, has been added to recover the feedback signal for A1. If the amplifier configured around A2 has a gain of unity (that is if R3/R4=R5/R6=1 and the reactances of C2 and C3 are small compared to the resistances of R4 and R6 at the lowest frequency of interest), the equation $\alpha = -Z_1/Z_2$ still applies. More generally, $\alpha = -Z_1/gZ_2$ where g is the gain of the amplifier stage consisting of A2, R3-R6, C2 and C3. In a practical telephone terminal device, g will be set to some value less than unity so that A2 will not be driven out of its common mode range with the various common mode signals and noises that are found on telephone lines. Note that the equation for the voltage gain of the circuit does not include any reference to the transformer; provided that the transformer meets the conditions established for the impedance '$Z_x$' in FIG. 2, a very close approximation of circuit performance can be predicted without taking the transformer into account. This means that the transformer-related problems of frequency response and phase shift discussed in the introduction do not apply to this circuit, even over wide variations of DC current in the output winding, and a transformer that is smaller, lighter in weight, and cheaper than can be used in conventional circuits can be used in this circuit.

As stated earlier, a practical telephone terminal device must exhibit some specific impedance to the telephone line. Various methods exist for making an amplifier circuit emulate a particular impedance, including one previously published by the present inventor (Sinberg, Howard; "Port Technique Allows Complex Impedance Emulation and Scaling"; EDN Magazine, May 1, 1986). Any such technique can be applied to the present invention; the particular one discussed below is given for illustrative purposes only and is not represented as being the best for any specific application.

Figure 5:
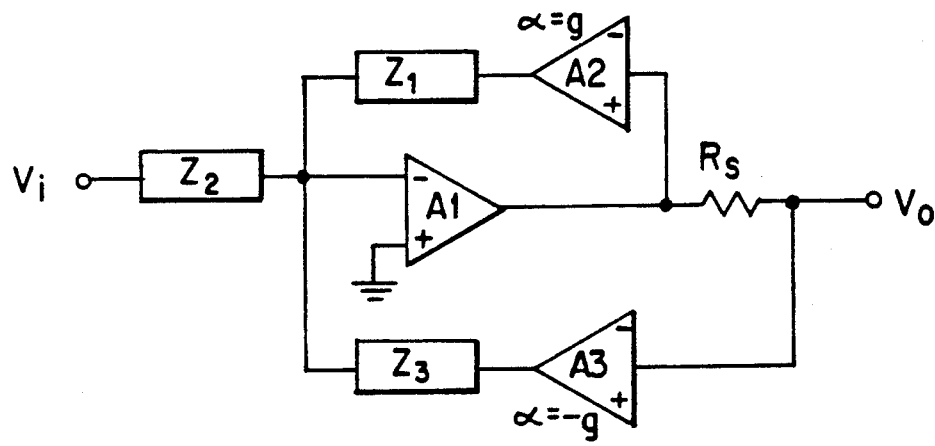
FIG. 5 is a schematic circuit arrangement showing a technique for emulating a particular impedance at its output terminal.

In the circuit for FIG. 5, stages A2 and A3 represent complete amplifier circuits with voltage gains of g and $-g$. This circuit (shown in single ended form for simplicity) exhibits an impedance at its output terminal that is a function of the impedances $Z_1$ and $Z_3$ in accordance with the equation $Z_o = R_s Z_3 / (Z_3 - Z_1)$ and a voltage gain $\alpha = -Z_1 Z_3 / [2gZ_2 (Z_3 - Z_1)]$ when it is terminated in its own characteristic impedance. Impedance $Z_2$ can be specified so that $\alpha = -1$ when the circuit is properly terminated: $Z_2 = Z_1 Z_3 / [2g(Z_3 - Z_1)]$. The circuit shown in FIG. 4 can now be modified to take advantage of the impedance-emulating technique illustrated in FIG. 5; the result is one implementation of a complete telephone terminal device and is shown in FIG. 6.

Figure 6:
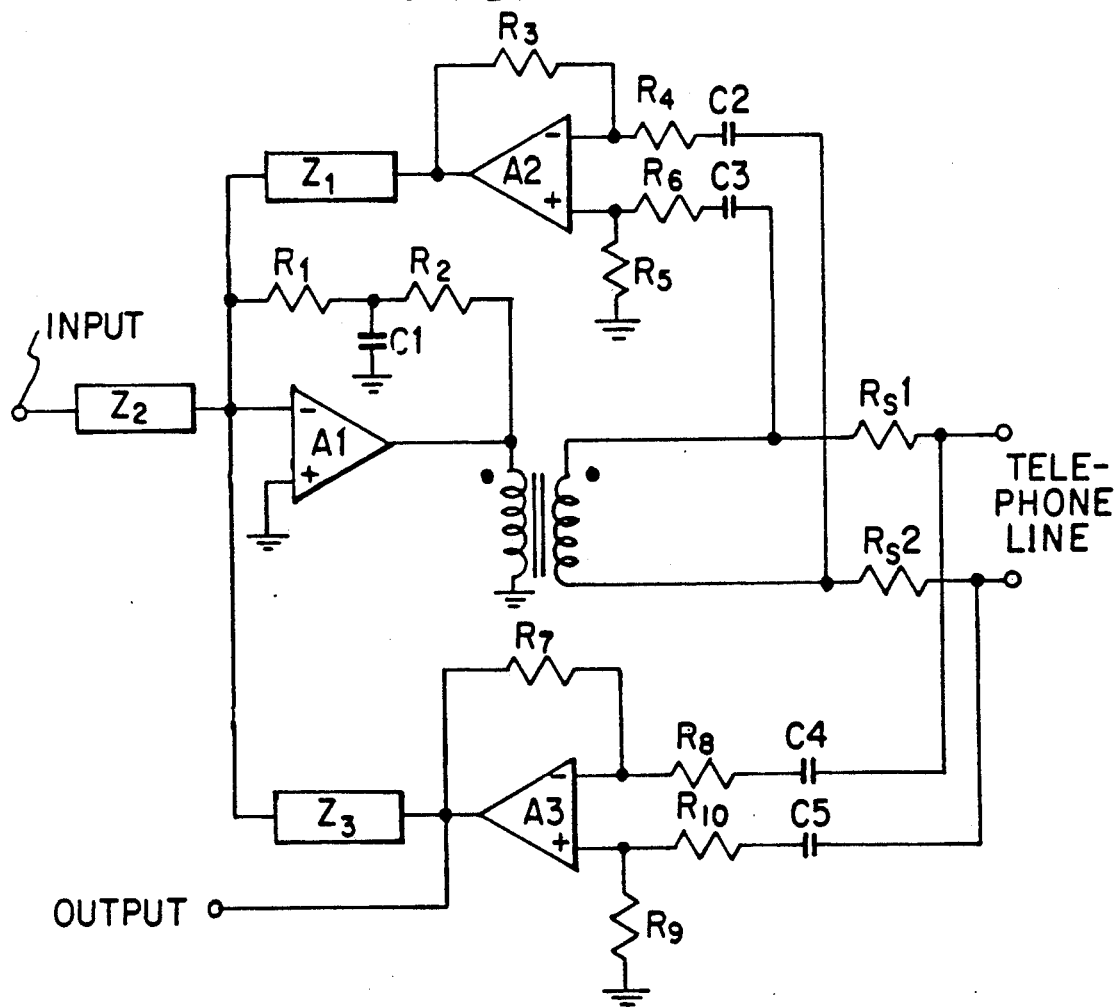
FIG. 6 is a schematic circuit arrangement in accordance with the invention illustrating the inclusion of a transformer in the feedback loop wherein the arrangement presents a known output impedance.

FIG. 6 can be related to FIG. 5 when it is understood that the gain of the amplifier stage incorporating operational amplifier A2 in FIG. 6 corresponds to the gain g of stage A2 in FIG. 5, and is equal to R3/R4 and to R5/R6 (which ratios themselves are equal to maintain common mode rejection) with C2 and C3 having small reactances compared to resistors R4 and R6. Likewise the gain of the amplifier stage incorporating operational amplifier $A_3$ in FIG. 6 corresponds to the gain g of stage $A_3$ in FIG. 5, and is equal to $R_7/R_8$ and to $R_9/R_{10}$ (which ratios are similarly equal) with $C_4$ and $C_5$ having small reactances compared to resistors $R_8$ and $R_{10}$. The same variable, "g", is used to describe both gains because in a typical implementation they will be made equal, although this is not absolutely a requirement. Further, output series resistor $R_s$ in FIG. 5 is replaced by resistors $R_s1$ and $R_s2$ in FIG. 6. In this circuit the terminal impedance measured at the telephone line connections is solely a function of impedances $Z_1$ and $Z_3$, and is independent of the characteristics of the transformer. Therefore, the terminal impedance can be altered or selected by altering or selecting $Z_1$ and $Z_3$, eliminating the necessity for taps on the transformer windings. This furthers the goal of employing a small and inexpensive transformer.

An input terminal connected through impedance $Z_2$ to amplifier $A_1$ allows a signal to be transferred to the telephone line. A feature added to FIG. 6 is a terminal at the output of amplifier $A_3$; this output terminal allows a signal to be received from the telephone line. Such a signal will be equal in amplitude to that appearing across the telephone line times the gain g of the $A_3$ stage; in a typical implementation this output will be followed by an amplifier stage having a gain of 1/g to return this signal to its original amplitude. Such a gain stage can also be used to subtract the input signal from the output, thereby achieving hybrid cancellation.

FIG. 6 thus illustrates a terminal device that presents a balanced termination to a telephone line, exhibits a known and controlled impedance to that line, and provides for signals to be coupled to and from that line. Some practical requirements of devices that connect to telephone lines and which can be related to FIG. 6 will now be considered. In this discussion, the phrase "regulatory agencies" refers to the telecommunications administrations that govern such connections in various countries (the Federal Communications Commission in the United States, for example). In order to be useful in practice, a telephone terminal device must meet the requirements of these agencies, which, though differing in detail, are generally similar.

Regulatory agencies require that the telephone line connections to a terminal device be isolated from all other connections for D.C. voltage. The magnitude of the D.C. voltage which this isolation is required to withstand determines the voltage rating of capacitors $C_2$ through $C_5$ and of the transformer. An additional leakage requirement applies to A.C. signals. With a given A.C. voltage of specified frequency applied between the telephone connections and all other connections, no more than some specified maximum current must flow. Resistors $R_4$, $R_6$, $R_8$ and $R_{10}$ must be designed to accommodate this requirement: the applied voltage determines the physical characteristics of the resistors (they must be sufficiently long so as not to arc over) and the allowable leakage current determines their resistance. Further, the capacitance of $C_2$–$C_5$ must be chosen so that the voltage drop across these capacitors does not exceed their ratings (in an A.C. environment the voltage drop across $C_2$–$C_5$ is a function of their reactances at the specified frequency compared to the resistances of $R_4$, $R_6$, $R_8$ and $R_{10}$).

Additionally, regulatory agencies mandate two tests that emulate the effects of nearby lightning strikes. One is a brief high voltage surge from the telephone connection to circuit ground, which may impose further conditions on components $R_4$, $R_6$, $R_8$, $R_{10}$ and $C_2$–$C_5$. Another is a brief high voltage surge across the two wires of the telephone connection. This determines the breakdown voltage and power ratings for resistors $R_s1$ and $R_s2$. Finally, some agencies also mandate a "power cross" test in which the two telephone wires are connected across a source of specified A.C. voltage for a specified period of time. This may put further conditions on $R_s1$ and $R_s2$, and on the transformer. As a practical matter, component value may be selected which meet all of these requirements.

While the foregoing description and drawings represent the preferred embodiments of the present invention, it will be obvious to those skilled in the art that various changes and modifications may be made therein without departing from the true spirit and scope of the present invention.

What is claimed is:

1. An arrangement for enabling gain of the arrangement to avoid varying in response to variations in frequency of an input signal, the arrangement comprising:
   an operational amplifier having an inverting input, a non-inverting input and an output;
   an input impedance connected between an input terminal and the amplifier inverting input, said input terminal being adapted to receive the input signal whose frequency may vary;
   a transformer having a primary winding and a secondary winding; and
   a feedback loop including a feedback impedance connected between an output terminal and the inverting input of said amplifier, the primary winding being connected to the output of said amplifier and including the secondary winding being connected to said output terminal so that said transformer is included within the feedback loop and thereby enables gain of the arrangement to be free from varying in response to variations in the frequency of the input signal as the input signal is received at said input terminal.

2. The arrangement of claim 1 wherein direct current stabilizing means is provided from the amplifier output to the amplifier inverting input.

3. The arrangement of claim 2 wherein said direct current stabilizing means includes a pair of resistors connected in series at a connection point and a capacitor connected from said connection point to circuit ground.

4. The arrangement of claim 1 wherein direct current stabilizing means is provided from the output of said operational amplifier to said inverting input of said operational amplifier by a direct current feedback circuit which is independent of said feedback loop, said feedback loop providing alternating current feedback only.

5. The arrangement of claim 1, wherein said circuit gain approximates a negative of a ratio of impedance of $Z_1$ over $Z_2$, that is, $-Z_1/Z_2$ in which the negative indicates that said operational amplifier is an inverting amplifier.

6. In a terminal device for connection to a telephone line, an arrangement for effecting isolation between the telephone line and other connections to the terminal device and for enabling gain of the arrangement to be free from varying in response to variations in frequency of an input signal, comprising:
   a first operational amplifier having an inverting input, a non-inverting input and an output;

an input impedance connected from an input terminal to the amplifier inverting input, said input terminal being adapted to receive the input signal whose frequency may vary;

a line isolation transformer having a primary winding and a secondary winding, the primary winding being connected between the output of said amplifier and circuit ground, the secondary winding being balanced with respect to ground; and a second operational amplifier having an inverting input, a non-inverting input and an output, the transformer secondary winding being coupled to the second operational amplifier inverting and non-inverting inputs by respective input resistors and direct current blocking capacitors;

a feedback impedance being connected between the output of said second operational amplifier and the inverting input of said first operational amplifier, said line isolation transformer being included within the feedback loop of said first operational amplifier and having a balanced output winding for providing isolation and enabling gain from said input terminal to said balanced output to be free from responding to variations in frequency of the input signal when received at said input terminal.

7. The arrangement of claim 6 wherein d.c. stabilizing means is provided from the first amplifier output to the first amplifier inverting input.

8. The arrangement of claim 7 wherein said d.c. stabilizing means includes a pair of resistors connected in series at a connection point and a capacitor connected from said connection point to circuit ground.

9. The arrangement of claim 6 including means to establish a predetermined impedance at the output of said arrangement.

10. The arrangement of claim 9 also including, in order to provide a known and controlled impedance to the line, a first resistor connected between one side of said output transformer winding and one output terminal and a second resistor connected between the other side of said output transformer winding and the other output terminal and a third operational amplifier circuit coupled from the output terminals to the inverting input of said first amplifier through an impedance, $Z_3$.

11. The arrangement of claim 1 or claim 6 or claim 9 employing a smaller and cheaper transformer than could be used without the feedback arrangement.

12. The arrangement of claim 10 wherein the output terminals are connected to a telephone line and a further output terminal is provided at the output of the third operational amplifier for providing a signal received from the telephone line as an output signal.

13. The arrangement of claim 9, wherein said second and third amplifier include coupling resistors and capacitors, the values and ratings of said coupling resistors and capacitors being selected to meet regulatory agency requirements for a.c. and d.c. leakage, high voltage surge and "power cross" tests.

* * * * *